(12) United States Patent
Menkhoff

(10) Patent No.: US 7,304,546 B2
(45) Date of Patent: Dec. 4, 2007

(54) CONTROL LOOP FILTER

(75) Inventor: Andreas Menkhoff, Oberhaching (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 11/257,407

(22) Filed: Oct. 21, 2005

(65) Prior Publication Data

US 2006/0091963 A1 May 4, 2006

(30) Foreign Application Priority Data

Oct. 28, 2004 (DE) ............... 10 2004 052 416

(51) Int. Cl.
*H03L 7/00* (2006.01)
(52) U.S. Cl. ......................... 331/17; 331/16
(58) Field of Classification Search .................. 331/17
See application file for complete search history.

(56) References Cited

U.S. PATENT DOCUMENTS

| | | | |
|---|---|---|---|
| 6,018,556 A | | 1/2000 | Janesch et al. |
| 6,108,151 A | * | 8/2000 | Tuttle et al. ................... 360/51 |
| 2004/0012448 A1 | * | 1/2004 | Bonhaus et al. .............. 331/17 |
| 2004/0183602 A1 | | 9/2004 | Maunuksela et al. |

FOREIGN PATENT DOCUMENTS

| | | |
|---|---|---|
| DE | 19612884 | 3/2003 |
| JP | 01084302 | 3/1989 |

OTHER PUBLICATIONS

German Office Action dated Jun. 24, 2005.
Chinese Office Action dated Aug. 3, 2007 (with English translation).

* cited by examiner

*Primary Examiner*—Joseph Chang
(74) *Attorney, Agent, or Firm*—Jenkins, Wilson, Taylor & Hunt PA

(57) ABSTRACT

A feedback control loop having a filter response and a cut-off frequency comprises a system under control for generating an output signal being an output signal of the feedback control loop in response to a control difference signal, a loop filter for generating a feedback signal in response to the output signal and a subtraction device for generating the control difference signal by subtracting the feedback signal from an input signal fed to the feedback control loop. The loop filter is adjustable by means of a filter coefficient set having in each case at least one filter coefficient, each depending on a setting parameter, so that a filter coefficient set for adjusting the filter response of the feedback control loop can be selected and the cut-off frequency of the feedback control loop is adjustable externally in a manner dependent on the setting parameter.

16 Claims, 7 Drawing Sheets

CONTROL LOOP FILTER

BACKGROUND OF THE INVENTION

1. Field of the Invention

The invention relates to a control loop filter.

2. Description of the Prior Art

One or a plurality of control loops are provided in many technical apparatuses, in particular in signal receivers.

FIG. 1 shows a control loop according to the prior art. A device of the control loop subtracts a feedback signal, which is output by an internal loop filter, from an input signal present at an input E. This device is formed, in a carrier frequency controlled loop, for example, by a mixer that reduces the carrier frequency deviation of the input signal for the controlled system.

The control difference or control deviation generated by the mixer or subtractor passes via a controlled system to an output A of the control loop. The output signal of the controlled system, or the controlled variable, is filtered by the loop filter and output as feedback signal to the subtractor. The loop filter or the controller feeds the output signal of the control loop back to the input. The loop filter or the controller is chosen in a manner dependent on the controlled system to be controlled. The control loop according to the prior art as illustrated in FIG. 1 contains a PID controller composed of a proportional (P) controller, an integral (I) controller, and a derivative (D) controller.

The feedback signal output by the PID controller or the loop filter is produced from the output signal as follows:

$$x_R(t) = K_P x_a(t) + K_I \int x_a(t) dt + K_D \frac{dx_a(t)}{dt} \quad (1)$$

where $K_P$, $K_I$, $K_D$ represent the transfer values or control parameters of the controller.

The transfer function of the loop filter reads as follows:

$$H_R(s) = K_P + \frac{K_I}{s} + K_D s = \frac{K_D \cdot s^2 + K_P s + K_I}{s} \quad (2)$$

FIG. 1 shows a control loop having a PID controller, in which a proportional controller, an integrator controller and a derivative controller are connected in parallel in a loop filter. A loop filter of this type can be extended by connecting in parallel further signal branches in which, by way of example, a plurality of integrators or differentiators are connected in series. The choice of the loop filter or controller depends on the controlled system to be controlled. Controlled systems having a delaying transfer response require an I or PI controller. Although controlled systems having an integration action managed with a P controller, certain additional improvements are possible with a PI controller. In many control tasks, a PID controller is advantageous with regard to realization complexity, handling and achievable effect.

The control loop according to the prior art as illustrated in FIG. 1 may be constructed in digital or analogue form. Control loops are used in particular in the signal receivers. These control loops have to be set differently depending on different requirements. In the case of adjustment to an input signal, the control loop is firstly set, in a so-called acquisition mode, in such a way that it is as fast as possible, that is to say in such a way that it minimizes the control deviation as rapidly as possible. Afterwards, the controller of the control loop is set in such a way that it is sluggish or slow, in order to effect good suppression of disturbances of the control deviation. The controller or the loop filter is set with the aid of the control parameters $K_P$, $K_I$, $K_D$.

In many applications, an integrated circuit contains a multiplicity of control loops. By way of example, it is customary to provide, on a digital receiver, a control loop for analogue gain setting, a further control loop for digital gain setting, a control loop for carrier frequency setting, a control loop for carrier phase setting and, finally, a further control loop for clock phase setting.

Moreover, further control loops are provided for channel estimation within a receiver.

Therefore, in many application circuits, in particular in receivers, it is necessary to set more than six control loops which, moreover, also mutually influence one another as well. If each of the more than six control loops has a PI controller or a PI loop filter, then more than 12 control parameters have to be set. If each control loop is provided with a PID controller, then more than 18 control parameters have to be set by the user. In the case of a PID squared controller, it is even necessary to set more than 24 control parameters. The setting of the control parameters brings about a change in the limiting frequency of the control loop and also a change in the filter response or the filter characteristic of the control loop, this change being difficult for the user to foresee.

SUMMARY OF THE INVENTION

It is an object of the present invention to provide a control loop whose filter response and whose limiting frequency can be adjusted in a relative simple manner for a user.

The object is achieved in accordance with the invention by means of a control loop having a adjustable filter response and adjustable limiting frequency for the filtering of an input signal, the control loop containing a device, which subtracts from the input signal to be filtered a feedback signal for the generation of a control difference signal, which is applied to a controlled system, the output signal of which forms the filtered output signal of the control loop, and which is filtered by a loop filter for the generation of the feedback signal, the loop filter being settable by means of a filter coefficient set having in each case at least one filter coefficient each filter coefficient depending on a setting parameter, it being possible to select a filter coefficient set for the setting of the filter response of the control loop and the limiting frequency of the control loop being settable externally in a manner dependent on the setting parameter.

The control loop may have an additional memory, in which a set of coefficient equations is stored for each adjustable filter response or for each adjustable filter type of the control loop.

In this case, a coefficient equation may be stored in the memory for each filter type in each case for each filter coefficient of the loop filter.

In this case, each stored coefficient equation may specify the dependence of a filter coefficient of the loop filter on the external setting parameter.

In a restricted version of the inventive control loop, the filter coefficient equations of a filter type can be read out from the memory in a manner dependent on an external selection signal for the selection of the filter response or of the filter type.

The filter coefficients of the loop filter may be set by means of the filter coefficient equations of the selected filter type that are read out from the memory, in a manner dependent on the externally applied setting parameter.

The loop filter may have at least one multiplier which in each case multiplies a filter coefficient set in a manner dependent on the setting parameter by the output signal of the controlled system.

In this case, the multiplier may be connected via only a proportional controller, an integral controller or a derivative controller to an adder of the loop filter.

The loop filter may be a PID loop filter.

In a further restricted version of the inventive control loop the control loop, the loop filter has at least one multiplexer which, on the output side, is connected to an adder of the loop filter via a proportional element, an integrator or a differentiator and which is connected, on the input side, to a plurality of calculation circuits connected in parallel, one calculation circuit being through-connected to the output of the loop filter in a manner dependent on an external selection signal.

The number of calculation circuits connected in parallel preferably corresponds to the number of settable filter types of the control loop.

Preferably, each calculation circuit in each case calculates a filter coefficient of the loop filter in a manner dependent on the setting parameter.

The loop filter may have a multiplier, which multiplies the setting parameter by the output signal of the controlled system and outputs the multiplied signal to all the calculation circuits of the loop filter.

The control loop may have an IIR filter response.

The inventive control loop may be of an analogue or an digital design.

The memory present may be programmable via an interface.

The controlled system of the inventive control loop may be formed by a signal delay path.

In one preferred embodiment of the inventive control loop the adjustable filter response can preferably be set inter alia as a Butterworth filter, as a Chebyshev filter or as an elliptical filter.

The inventive control loop may be integrated on a chip.

DESCRIPTION OF THE PREFERRED EMBODIMENTS

Figure 1:
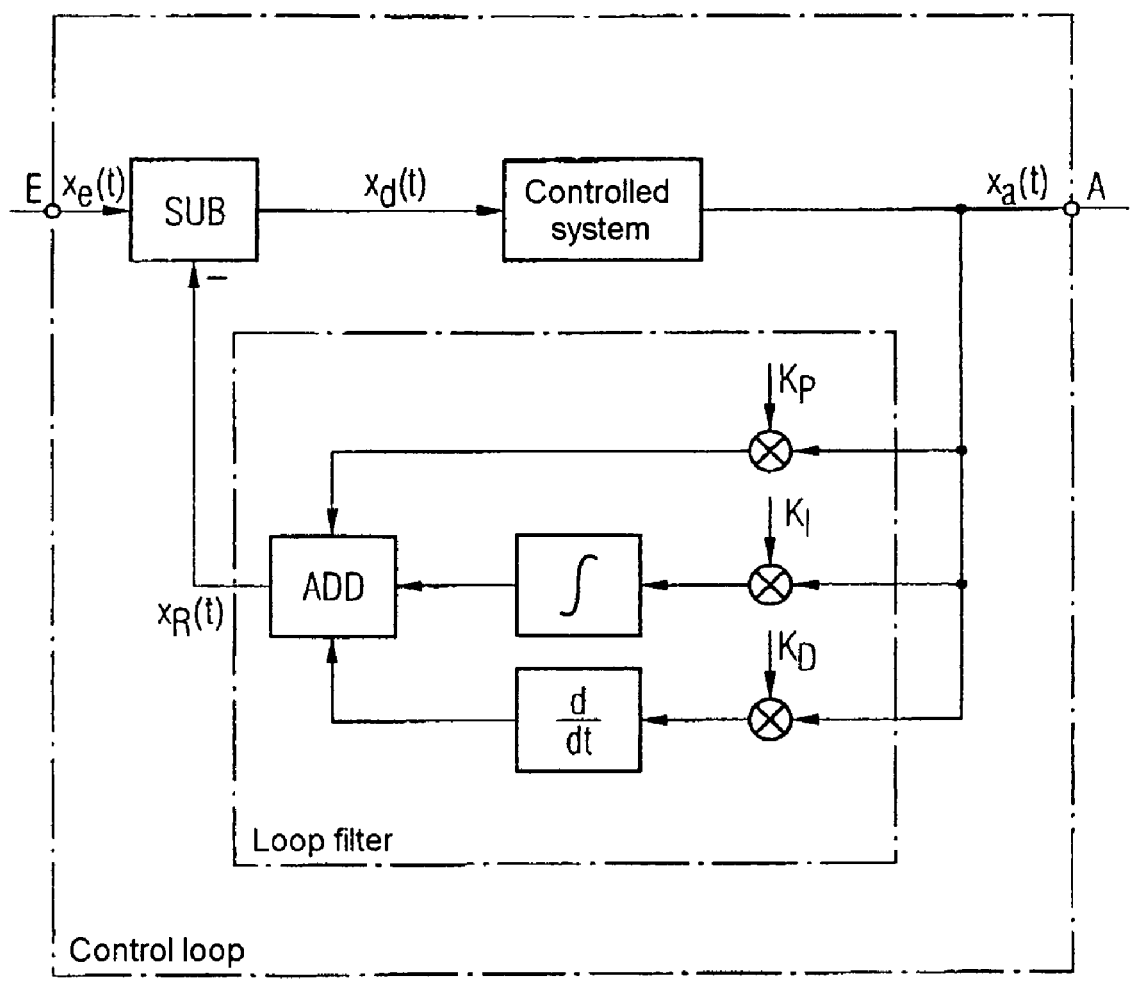
FIG. 1 as discussed is about a control loop according to the prior art.
Figure 2:
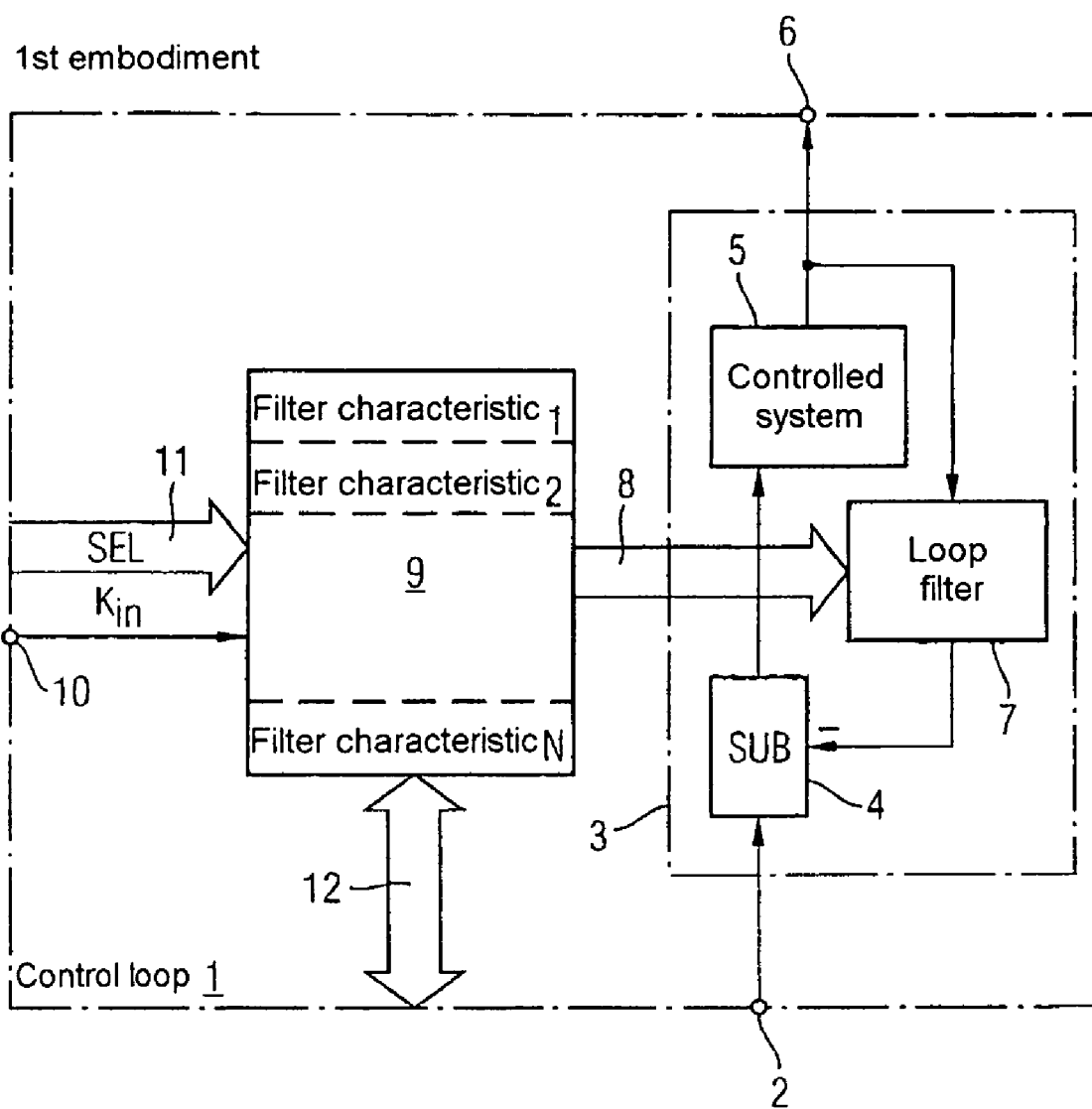
FIG. 2 is a first embodiment of an inventive control loop.

FIG. 2 shows a first embodiment of the control loop 1 according to the invention. The control loop 1 serves for filtering an input signal applied to a signal input 2 of the control loop. The input signal to be filtered is fed to an internal controlled loop 3 of the control loop 1 according to the invention. The input signal may be complex-valued in this case. The controlled loop 3 may be formed by a control loop according to the prior art such as is illustrated in FIG. 1. The controlled loop 3 contains a device 4 which subtracts, from the input signal that is to be filtered and is present at the signal input 2, a feedback signal $x_R$ for the generation of a control difference signal $x_d$. The control difference signal is applied to a controlled system 5 by the subtractor 4. The device 4 is preferably a subtractor. In an alternative embodiment (not illustrated), the device 4 is formed by a mixer, in this embodiment a carrier phase detector or a carrier frequency detector also additionally being provided in the feedback path upstream of the loop filter 7. As an alternative, the device 4 is formed by a resampling filter or by a Cordic circuit. The controlled system 5 is preferably a signal delay path. The output signal of the controlled system 5 is output via a line to a signal output 6 of the control loop 1. The output signal output by the controlled system 5 is furthermore applied via a line to a loop filter 7 of the controlled loop 3, which filters the output signal of the controlled system 5 for the generation of the feedback signal. The loop filter 7 is preferably a PID loop filter. The loop filter 7 is set by means of filter coefficients or by means of control parameters via setting lines 8. The control loop 1 according to the invention in accordance with the first embodiment illustrated in FIG. 2 contains a memory 9 in addition to the controlled loop 3.

N coefficient equations each defining a filter characteristic or a filter type are stored in the memory 9. A first filter characteristic exhibits a Butterworth filter response, by way of example, and a second filter characteristic describes a Chebyshev filter response. The filter characteristics or coefficient equations may also specify variants of the respective filter type, for example a Chebyshev filter with a high degree of overshoot or a Chebyshev filter with low overshoot behaviour. Each filter characteristic stored in the memory 9 comprises an associated coefficient equation for each filter coefficient of a loop filter 7 to be set. If M filter coefficients $K_i$ are to be set in the loop filter 7, each filter characteristic stored in the memory 9 comprises M coefficient equations. Each coefficient or parameter equation in turn specifies the dependence of the filter coefficient of the loop filter 7 on an external setting parameter ($K_{in}$).

The control loop 1 according to the invention has a setting input 10 via which the user or the device in which the control loop 1 is incorporated can set or vary the setting parameter $K_{in}$.

One of the filter characteristics stored in the memory 9 is selected by the user via selection or address lines 11. The various filter characteristics of the memory 9 are programmed into the memory 9 beforehand preferably via an interface 12. The user selects the desired filter characteristic and sets the multiplicity of loop parameters or filter coefficients by altering a single external setting parameter ($K_{in}$). Consequently, in the case of the control loop 1 according to the invention, unlike hitherto, the user no longer sets the multiplicity of loop parameters or filter coefficients of the loop filter 7 separately, but rather selects a filter type then, according to the invention, varies only a single setting parameter $K_{in}$. The user or the application software transfers to the control loop 1 according to the invention a selection signal for the selection of the filter type and a setting parameter ($K_{in}$) for setting the frequency bandwidth of the control loop 1 according to the invention. The control loop has a high-pass filter transfer response, the limiting frequency fg of the high-pass filter transfer response being varied by the setting parameter $K_{in}$ that can be set externally. By virtue of the fact that the user only has to vary a single control parameter or setting parameter $K_{in}$, the setting of the control loop 1 according to the invention is considerably simplified in comparison with a conventional controlled loop such as is illustrated in FIG. 1. Particularly in the case of a receiver containing a multiplicity of control loops, the user or the application software requires only one setting parameter per control loop, with the result that the setting of the receiver is considerably facilitated or accelerated.

Figure 3:
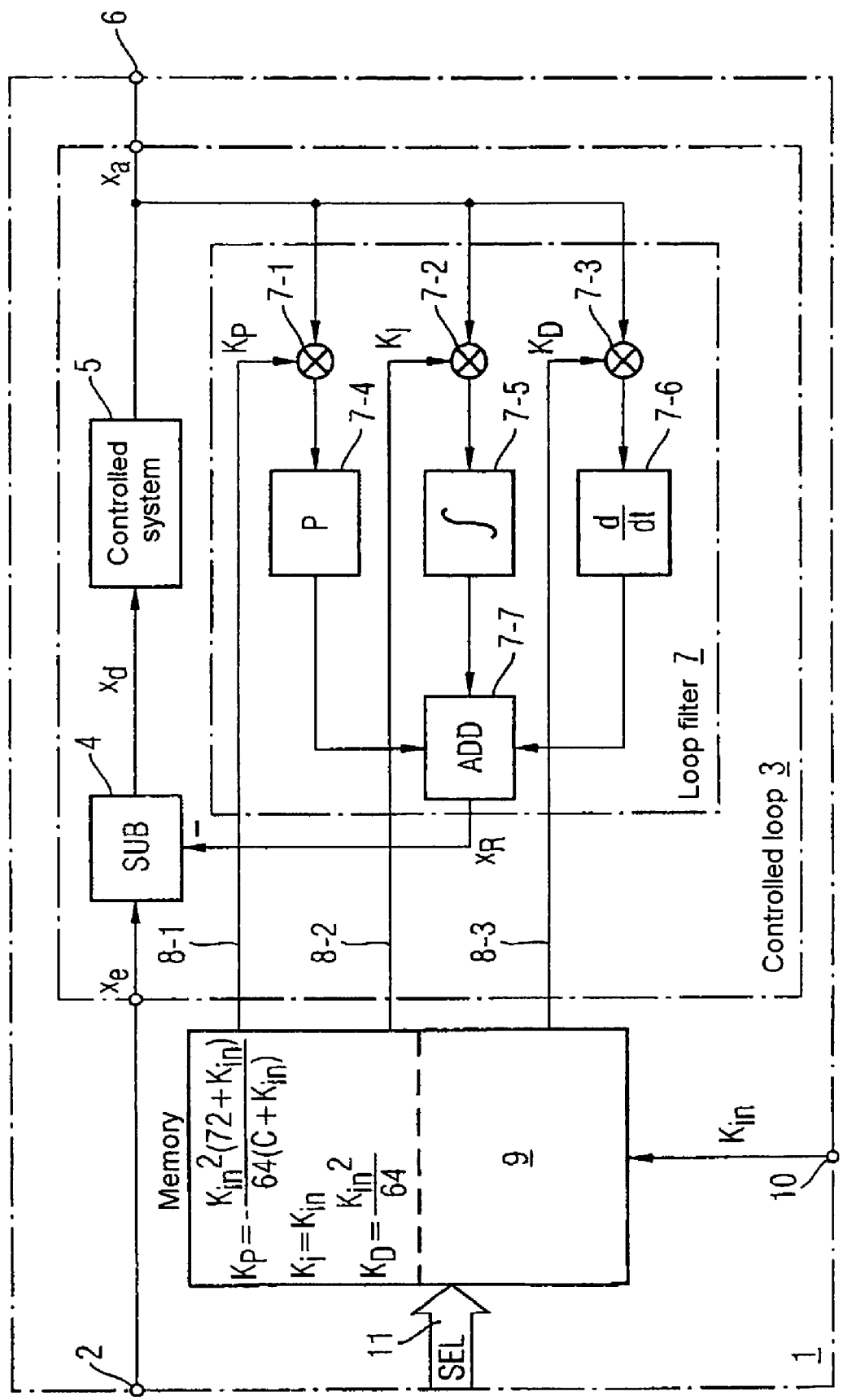
FIG. 3 is an alternative embodiment of an inventive control loop invention.

FIG. 3 shows an implementation of the control loop according to the invention in accordance with the first embodiment illustrated in FIG. 2. The loop filter 7 is formed by a PID controller as in FIG. 3. The loop filter 7 filters the output signal of the controlled system 5 for the generation of a feedback signal. In this case, the loop filter 7 contains a first multiplier 7-1, a second multiplier 7-2 and a third multiplier 7-3. On the output side, the first multiplier 7-1 is connected to a proportional element 7-4. In the case of the second multiplier 7-2, an integrator 7-5 is connected downstream. A differentiator 7-6 is connected downstream of the third multiplier 7-3. The output signals of the proportional element 7-4, of the integrator 7-5 and of the differentiator 7-6 are fed via lines to an adder 7-7, which adds the signals to form the feedback signal. The multipliers 7-1, 7-2, 7-3 provided in the loop filter 7 respectively multiply the output signal $X_a$ of the controlled system 5 by a filter coefficient or control parameter $K_P$, $K_I$, $K_D$. The filter coefficients $K_P$, $K_I$, $K_D$ are applied via setting lines 8-1, 8-2, 8-3. The user selects a set of coefficient equations stored in the memory 9 via the address line 11, and sets an external setting parameter $K_{in}$ via the setting input 10. By means of the coefficient equations read out from the memory 9, the filter coefficients $K_P$, $K_I$, $K_D$ for the loop filter 7 are calculated in a manner dependent on the external parameter $K_{in}$ that has been set. Each set of coefficient equations corresponds to a desired filter type having a predetermined filter response. The desired limiting frequency fg is set by means of the setting of the setting parameter $K_{in}$.

The characteristic function of a Butterworth filter in which the control system 5 is a delay is given as follows:

$$H(S)H(-s)=(64s^2-32\ s^4+4\ s^6)(-64\ ki^2+64\ s^2-64\ ki\ s^2-128kd\ ki\ s^2+48\ ki^2\ s^2+128\ kp\ s^2+64\ ki\ kp\ s^2+64\ kp^2\ s^2-32\ s^4-192\ kd\ s^4-64kd^2\ s^4+32\ ki\ s^4-12\ ki^2\ s^4-64\ kd\ kp\ s^4-32\ ki\ kp\ s^4-32\ kp^2\ s^4+4\ s^6-16\ kd\ s^6+16\ kd^2\ s^6-4\ ki\ s^6+8\ kd\ ki\ s^6+ki^2\ s^6-8\ kp\ s^6+16\ kd\ kp\ s^6+4\ ki\ kp\ s^6+4\ kp^2\ s^6) \quad (3)$$

The function represented in equation (2) represents a Butterworth high-pass filter if the powers $s^6$, $s^4$ and $s^2$ are identical. Solving the system of equations and subsequent Taylor series expansion about $K_i = K_{in} = 0$ produces:

$$kp = -\frac{K_{in}^2(72 + K_{in})}{64(8 + K_{in})},$$

$$ki = K_{in}$$

$$K_D = \frac{K_{in}^2}{64}$$

This characteristic is stored in the memory 9 as a set of coefficient equations.

The user or the application software sets the filter response of the control loop 1 according to a Butterworth filter response by the user reading out the corresponding set of coefficient equations or the corresponding filter characteristic from the memory 9 via the selection lines 11. The limiting frequency fg of the Butterworth high-pass filter is subsequently varied by way of the setting of the external setting parameter $K_{in}$.

Figure 4:
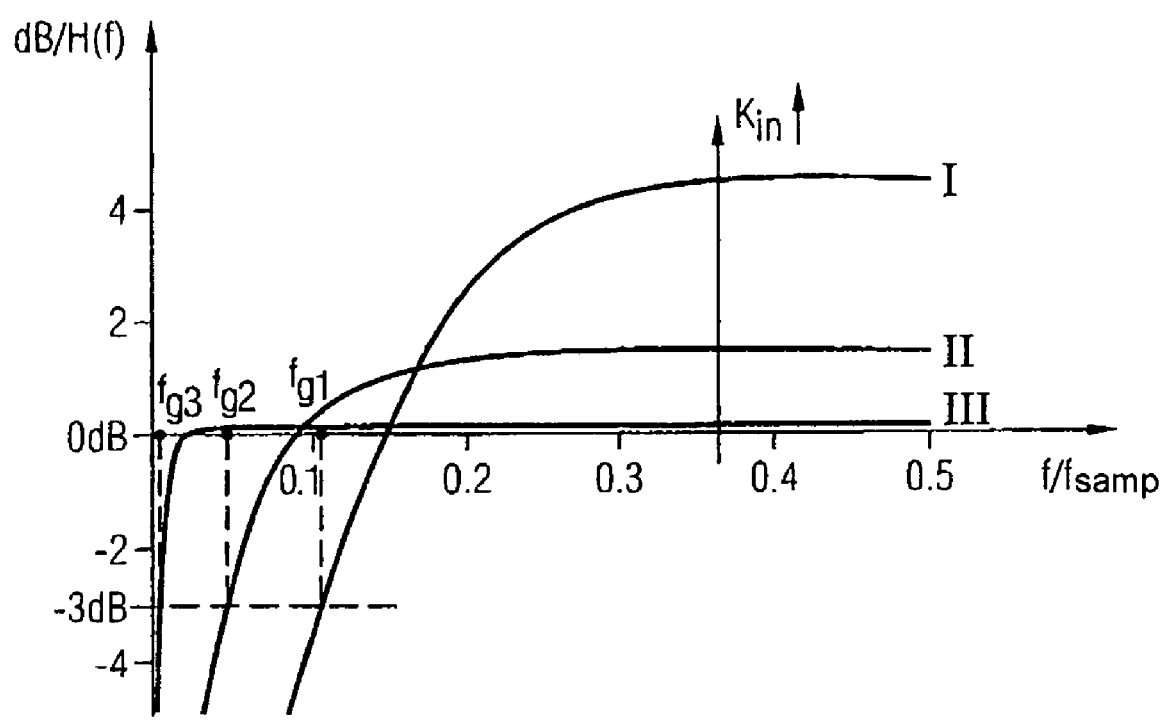
FIG. 4 is the transfer response of the control loop in accordance with the first embodiment as illustrated in FIG. 3.

FIG. 4 shows the transfer response of the control loop 1 according to the invention with a Butterworth high-pass filter response having been selected, in the case of changing the setting parameter $K_{in}$. As the setting parameter rises, the 3 decibel limiting frequency fg of the transfer function H(f) of the control loop 1 increases. It is thus very simple for the user to set the limiting frequency fg or the bandwidth by selection of the desired filter response and by subsequent setting of the external setting parameter $K_{in}$.

By programming the memory 9, it is possible to make available a multiplicity of different filter characteristics or filter types for a wide variety of applications. Therefore, the control loop 1 according to the invention in accordance with FIG. 3 can be employed particularly flexibly for different fields of use.

A further advantage of the control loop 1 according to the invention in accordance with the first embodiment furthermore consists in the fact that an arbitrary controlled loop 3 can be used to create a signal filter having an arbitrary filter response which can be set in a particularly simple manner. The control loop 1 according to the invention in accordance with the first embodiment can thus turn customary controlled loops 3 into an easily settable signal filter that can be used universally.

Figure 5:
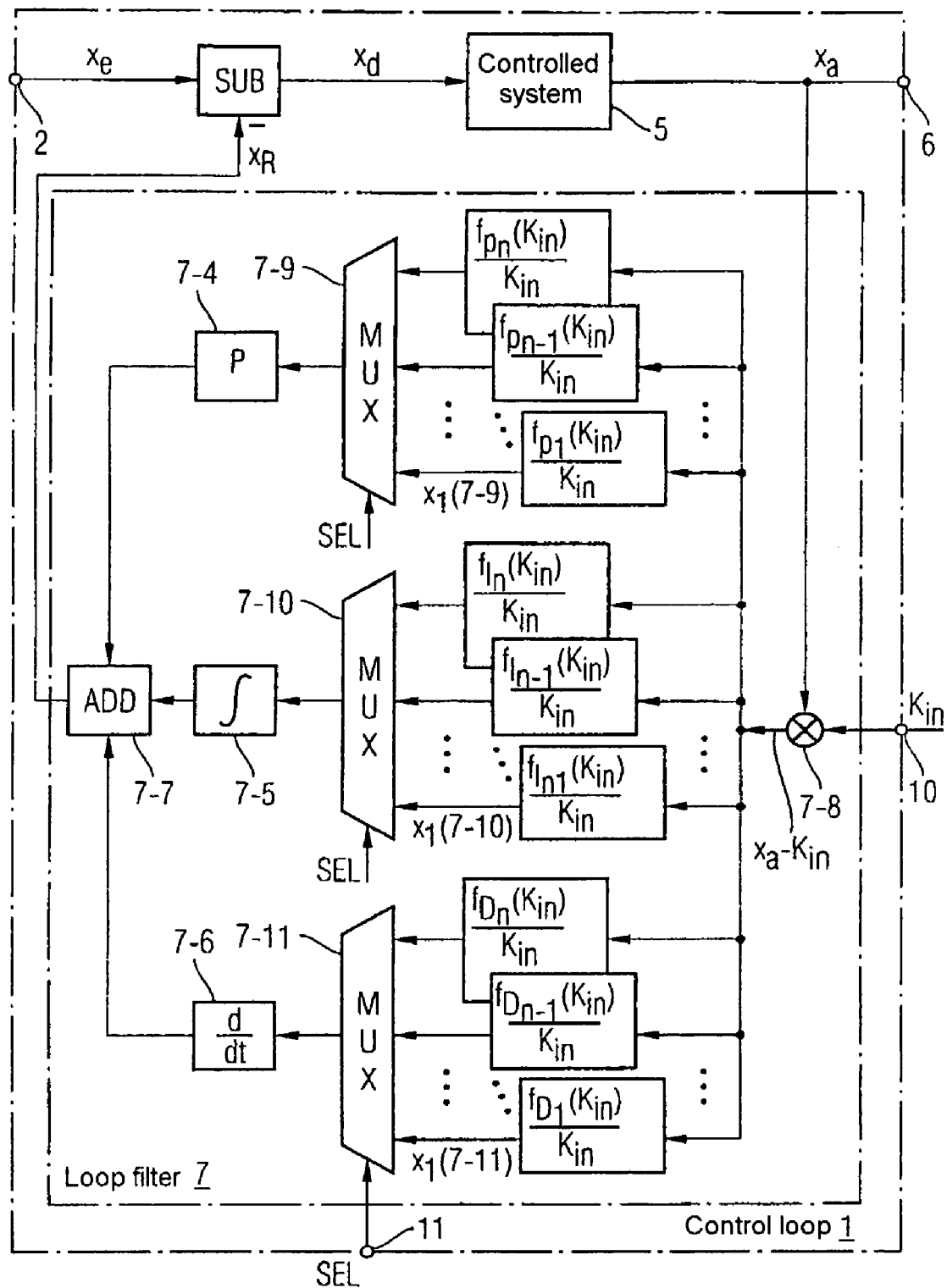
FIG. 5 is a further exemplary embodiment of an inventive control loop.

FIG. 5 shows an alternative embodiment of the control loop 1 according to the invention.

In the case of the second embodiment illustrated in FIG. 5, a memory 9 as in the first embodiment illustrated in FIG. 2 is not provided, rather the filter coefficients are calculated by means of hardware calculation circuits. These calculation circuits are provided within the loop filter 7. The output signal $x_a$ output by the controlled system 5 is multiplied by the externally settable setting parameter $K_{in}$ by means of a multiplier 7-8 of the loop filter 7. In contrast to the loop filter 7 of the first embodiment illustrated in FIG. 3, the loop filter 7 of the second embodiment illustrated in FIG. 5 has only one multiplier. This reduces the hardware outlay. The loop filter 7 in accordance with the second embodiment has a plurality of multiplexers 7-9, 7-10, 7-11, the first multiplexer 7-9 being connected via a proportional element 7-4, the second multiplexer 7-10 being connected via an integrator 7-4 and the third multiplexer 7-11 being connected via a differentiator 7-6 to an adder 7-7 of the loop filter 7. Each of the multiplexers has a control input to which is applied a selection signal SEL for the selection of a multiplexer input. Each multiplexer has a number N of multiplexer inputs which are in each case connected to outputs of calculation circuits. The number of calculation circuits which are connected in parallel and are connected to a multiplexer corresponds to the number of settable filter types of the control loop 1 according to the invention in accordance with the second embodiment. Each calculation circuit calculates a filter coefficient of the loop filter 7 in a manner dependent on the external setting parameter $K_{in}$. In the case of the second embodiment illustrated in FIG. 5 the calculation circuits respectively connected to the first input of the multiplexers 7-9, 7-10, 7-11 have the following calculation function:

$$x_{1(7-9)} = \frac{\int_{p1}(K_{in})}{K_{IN}} = \frac{1}{k_{IN}}(-1)\frac{k_{IN}^2 72 + K_{in})}{64(8+K_{in})} \quad (4)$$

$$x_{2(7-18)} = \frac{\int_{p2}(K_{in})}{K_{in}} = \frac{K_{in}}{K_{in}} = 1 \quad (5)$$

$$x_{3(7-27)} = \frac{\int_{p3}(K_{in})}{K_{in}} = \frac{1}{K_{in}}\frac{K_{in}^2}{64} = \frac{K_{in}}{64} \quad (6)$$

Figure 6:
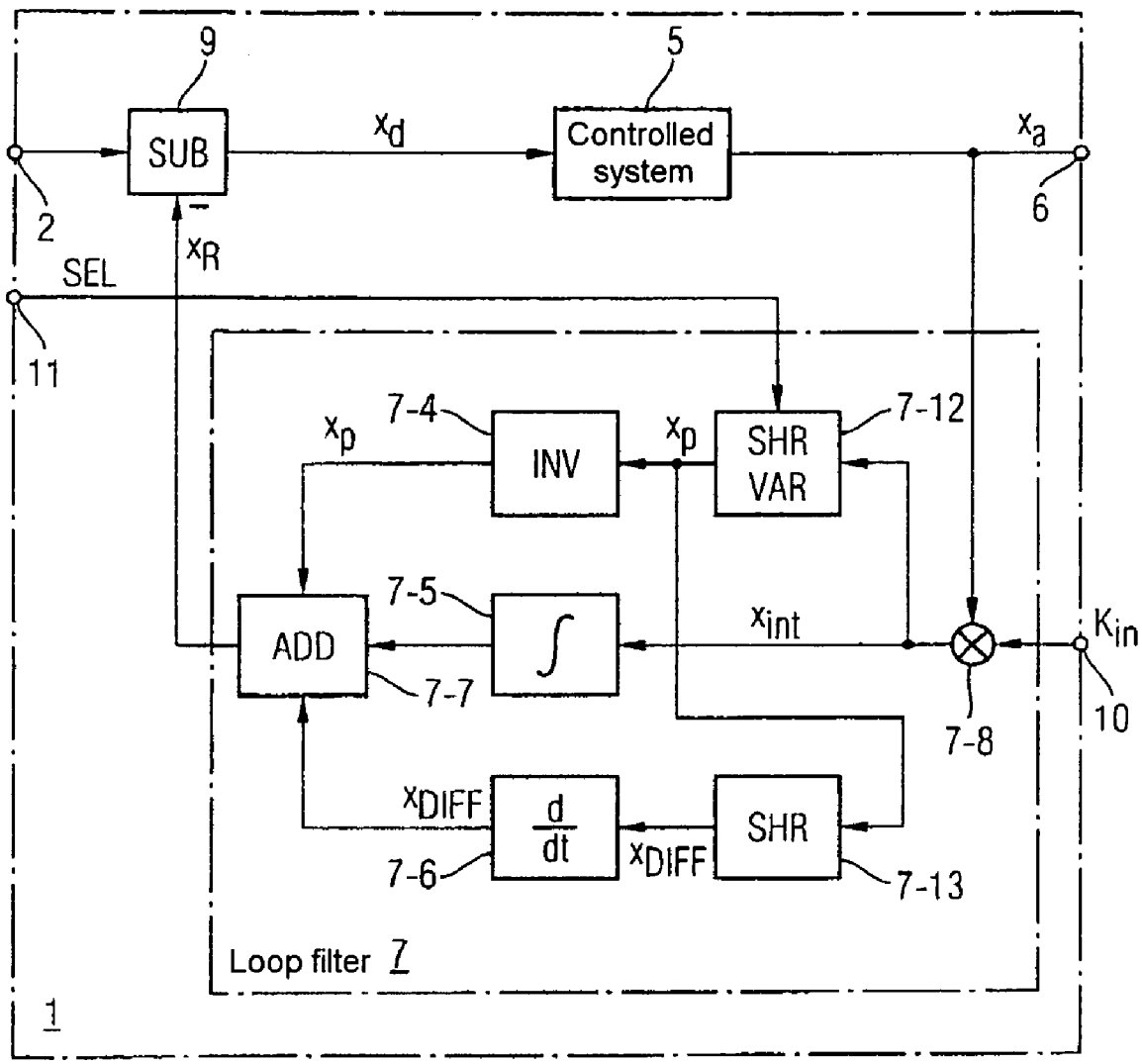
FIG. 6 is another exemplary embodiment of the inventive control loop with a Chebyshev filter response.

FIG. 6 shows a special implementation of the second embodiment of the control loop 1 according to the invention as illustrated in FIG. 5. In the case of the implementation illustrated in FIG. 6, the control loop 1 according to the invention has a Chebyshev filter response. The loop filter 7 of the control loop 1 is a PID controller having a proportional element 7-4 in the form of an inverter, an integration circuit 7-5 and a differentiator 7-6. The output signal of the controlled system 5 is multiplied by the external setting parameter $K_{in}$ by means of the multiplier 7-8 of the loop filter 7 and applied to a signal input of a shift register 7-12. The shift register 7-12 is a shift register which shifts the applied signal towards the right either by one bit or by two bits in dependence on the select signal SEL. The shift register 7-12 thus carries out either a division by a value two or a division by a value four in dependence on the select signal SEL. The output signal of the shift register 7-12 is fed to the inverter 7-4, on the one hand, and to a second shift register 7-13, on the other hand. The shift register 7-13 shifts the applied signal towards the right by one bit, so that a division by the value two is always effected. In contrast to the shift register 7-12, the shift register 7-13 cannot be set in variable fashion, but rather always carries out a bit shift by one bit towards the right.

If the selection signal SEL is logic low, a filter characteristic B is set with:

$$x_p = -\frac{K_{in}}{2}x_a \quad (7)$$

$$x_{int} = K_{in}x_a \quad (8)$$

$$x_{DIFF} = \frac{K_{in}}{4}x_a \quad (9)$$

If the selection signal SEL becomes logic high, the shift register 7-12 carries out a division by four by virtue of a bit shift by 2 bits towards the right being effected. This produces the filter characteristic A, where:

$$x_p = -\frac{K_{in}}{4} \quad (10)$$

$$x_{int} = K_{in} \quad (11)$$

$$x_{DIFF} = \frac{K_{in}}{8} \quad (12)$$

Figure 7A:
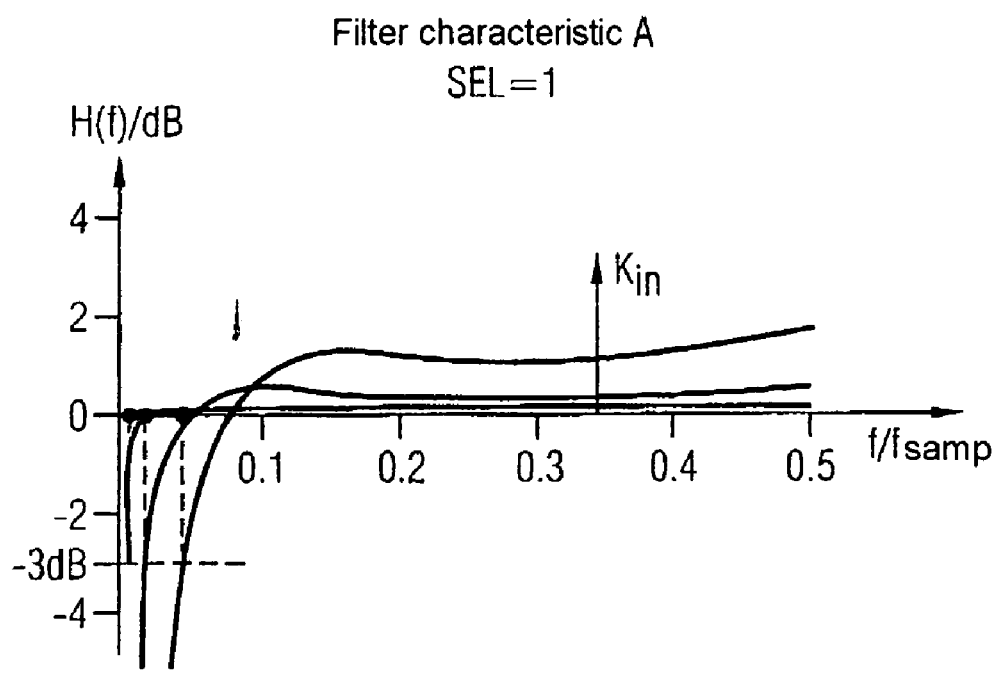
FIGS. 7a, 7b are two switchable filter characteristics of the inventive control loop as illustrated in FIG. 6.
Figure 7B:
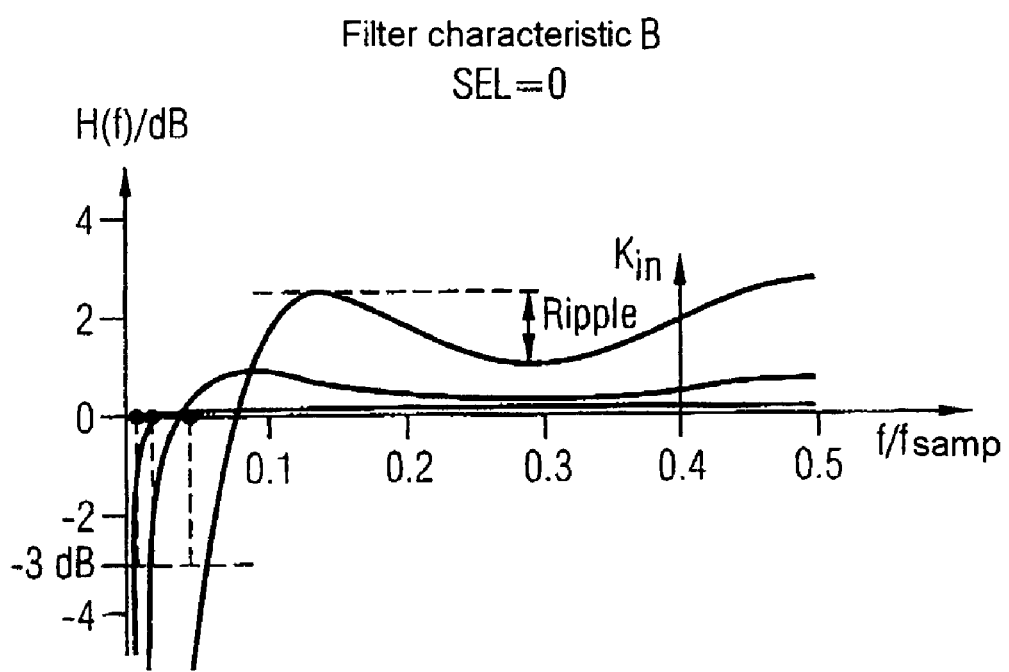

FIG. 7a, 7b show the transfer response of the implementation of the control loop 1 according to the invention in accordance with the second embodiment as a Chebyshev filter as illustrated in FIG. 6. If the selection control signal SEL is logic high, the filter characteristic A is set, while the filter characteristic B is set in the case of a logic low selection signal SEL. The filter characteristic A has a small fluctuation (ripple) of the transfer function in the passband frequency range. By contrast, the filter characteristic B has a relatively large fluctuation of the transfer function in the passband frequency range. Depending on the requirement, the user can select between the filter characteristic A and the filter characteristic B of a Chebyshev high-pass filter by setting the selection signal SEL. By changing the setting parameter $K_{in}$, he can additionally set the limiting frequency $f_g$ of the high-pass filter in a simple manner. The limiting frequency $f_g$ or the bandwidth of the control loop 1 is increased by increasing the setting parameter $K_{in}$. The user sets the filter properties of the control loop 1 not by directly setting the filter coefficients, but rather by selecting a desired filter characteristic and subsequently by setting a desired limiting frequency fg of this filter characteristic in a manner dependent on a setting parameter $K_{in}$ that can be set externally. The embodiment illustrated in FIG. 6 shows a control loop 1 of digital construction. In an alternative embodiment, the control loop 1 according to the invention may also be of analogue construction. Any desired filter characteristics can be implemented by means of the control loop 1 according to the invention. A loop filter 7 may be a controller of arbitrary construction. As evidenced by the exemplary embodiment illustrated in FIG. 6, it is possible to realize filter characteristics with a very low outlay on circuitry with the control loop 1 according to the invention.

Although modifications and changes may be suggested by those skilled in the art, it is the intention of the inventor to embody within the patent warranted heron all changes and modifications as reasonably and properly come within the scope of his contribution to the art.

I claim as my invention:

1. A feedback control loop having a filter response and a cut-off frequency, comprising:
    a system under control for generating an output signal being an output signal of said feedback control loop in response to a control difference signal;
    a loop filter for generating a feedback signal in response to said output signal;
    a subtraction device for generating said control difference signal by subtracting said feedback signal from an input signal fed to said feedback control loop;
    said loop filter being adjustable by means of a filter coefficient set having in each case at least one filter coefficient, each depending on a setting parameter, so that a filter coefficient set for adjusting said filter response of said feedback control loop can be selected and said cut-off frequency of said feedback control loop being adjustable externally in a manner dependent on said setting parameter; and
    a memory configured to store coefficient equations for each of said adjustable filter response with an associated coefficient equation being stored in said memory for each of said filter response in each case for each of said filter coefficients of said loop filter and each of said stored coefficient equations specifying the dependence of one of said filter coefficients of said loop filter on said external setting parameter and said filter coefficient equations for said filter response of said feedback control loop being read from said memory in a manner dependent on an external selection signal for the selection of said filter response.

2. The feedback control loop of claim 1, wherein said filter coefficients of said loop filter are set by means of said filter coefficient equations of said selected filter response that are read out from said memory, in a manner dependent on said applied setting parameter.

3. The feedback control loop of claim 1, wherein said loop filter comprises at least one multiplier for multiplying, in each case, said filter coefficient set in a manner dependent on said setting parameter by said output signal of said system under control.

4. The feedback control loop of claim 3, wherein said at least one multiplier is connected to an adder of said loop filter via a proportional element, an integrator or a differentiator.

5. The feedback control loop of claim 1, wherein said loop filter is a PID loop filter.

6. The feedback control loop of claim 1, wherein said loop filter has at least one multiplexer which, on its output side, is connected to an adder of said loop filter via a proportional element, an integrator or a differentiator and which is connected, on its input side, to a plurality of calculation circuits connected in parallel, each of said calculation circuits being through-connected to said output of said multiplexer in a manner dependent on an external selection signal.

7. The feedback control loop of claim 6, wherein said number of said calculation circuits connected in parallel corresponds to the number of adjustable filter types of said feedback control loop.

8. The feedback control loop of claim 6, wherein each of said calculation circuits in each case calculates a filter coefficient of said loop filter in a manner dependent on said setting parameter.

9. The feedback control loop of claim 6, comprising a multiplier for generating an multiplier output signal by multiplying said setting parameter by said output signal; said multiplier outputting said multiplier output signal to each of said calculation circuits of said loop filter.

10. The feedback control loop of claim 1, having an IIR filter response.

11. The feedback control loop of claim 1, being of analogue or digital design.

12. The feedback control loop of claim 1, wherein said memory is programmable via an interface.

13. The feedback control loop of claim 1, wherein said system under control is a signal delay path.

14. The feedback control loop of claim 1, wherein said adjustable filter response of said feedback control loop corresponds to a Butterworth filter, a Chebyshev filter or an elliptical filter.

15. The feedback control loop of claim 1, being integrated on a chip.

16. The feedback control loop of claim 1, wherein said subtraction device is a subtractor, a mixer, a resampling filter, or a Cordic circuit.

* * * * *